Oct. 8, 1963 P. W. WARREN 3,106,016
METHOD AND EQUIPMENT FOR BONDING METAL
Filed Oct. 28, 1958 4 Sheets-Sheet 1
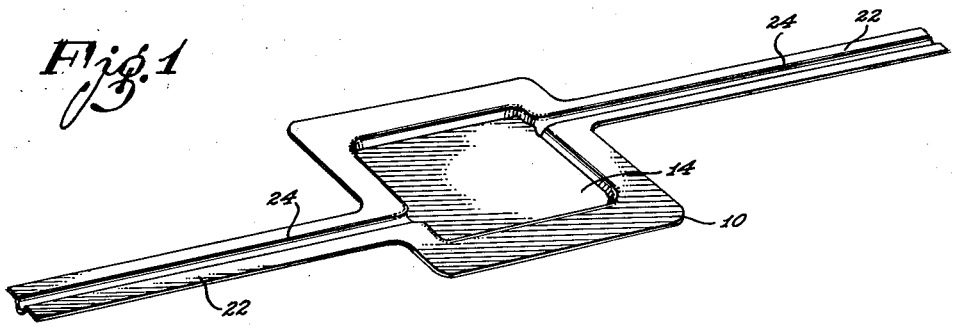
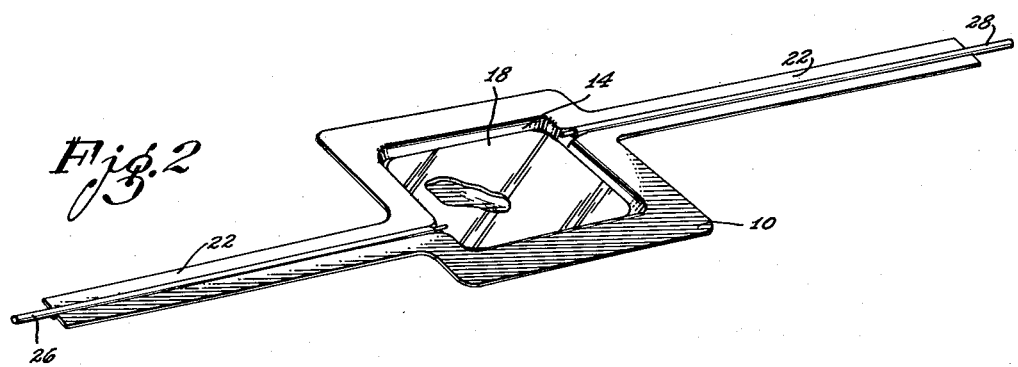
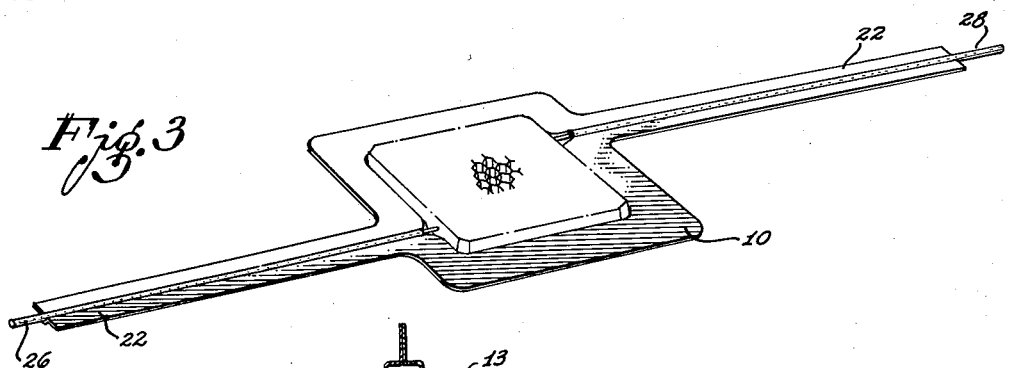
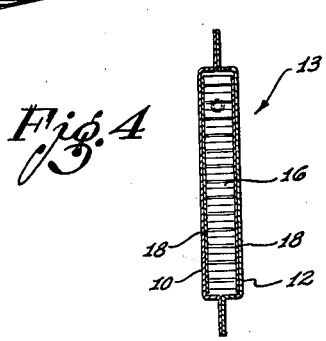
INVENTOR:
Paul W. Warren
By Willard M. Graham
Agent

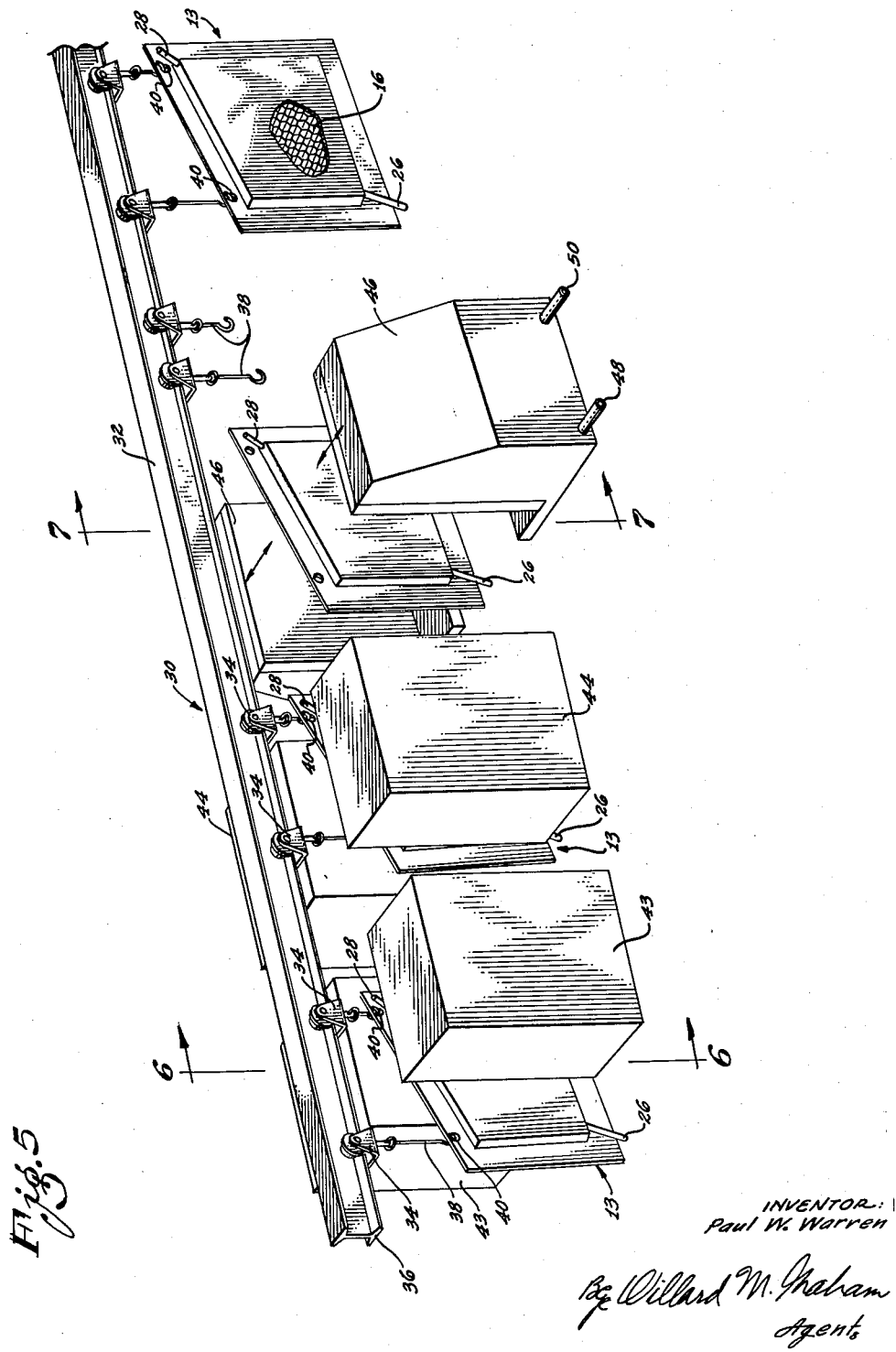

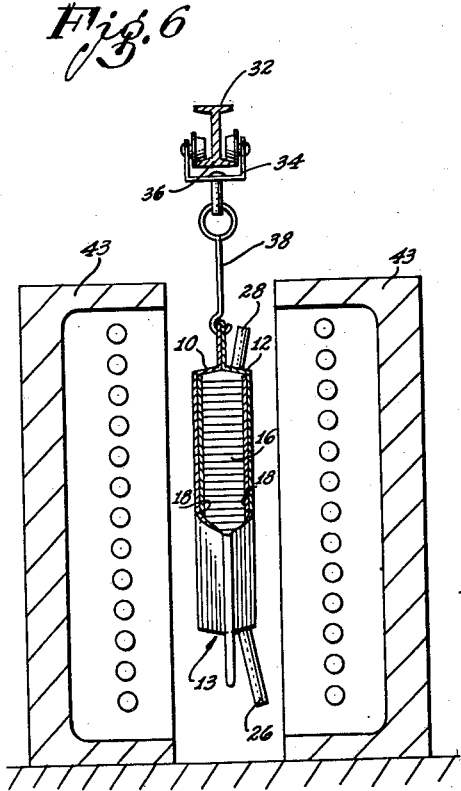
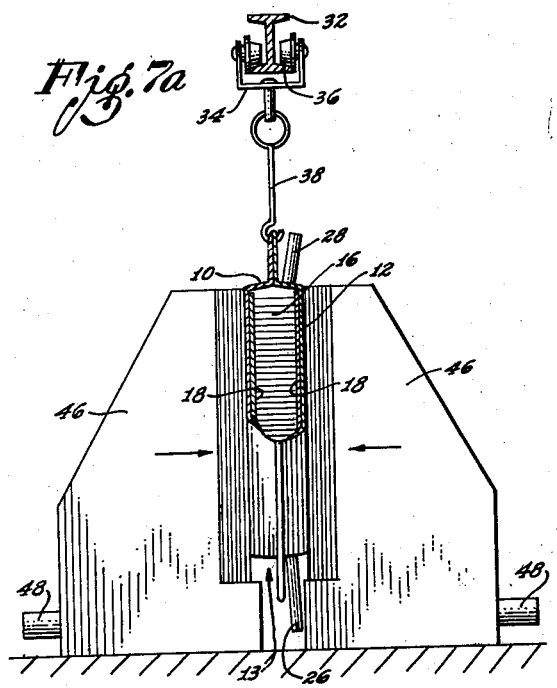
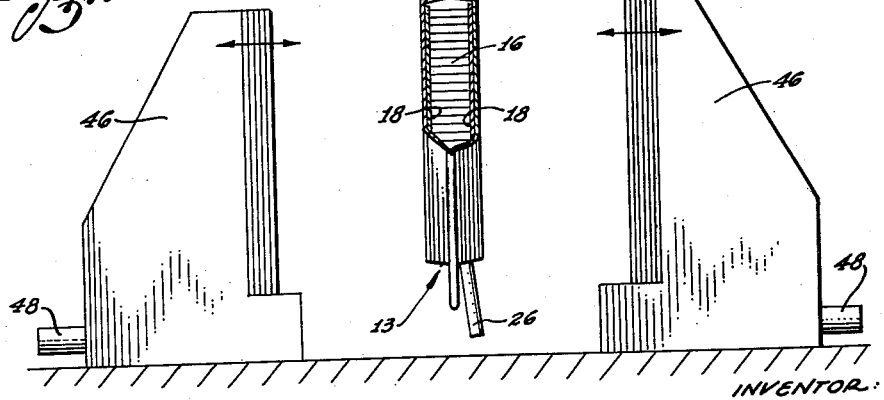

Oct. 8, 1963 P. W. WARREN 3,106,016
METHOD AND EQUIPMENT FOR BONDING METAL
Filed Oct. 28, 1958 4 Sheets-Sheet 4

INVENTOR:
Paul W. Warren

By Willard M. Graham
Agent

United States Patent Office 3,106,016
Patented Oct. 8, 1963

3,106,016
METHOD AND EQUIPMENT FOR BONDING METAL
Paul W. Warren, Los Angeles, Calif., assignor to Northrop Corporation, a corporation of California
Filed Oct. 28, 1958, Ser. No. 770,080
5 Claims. (Cl. 29—498)

This invention has to do with the method or process of providing a metal-to-metal bond of cellular materials and panels.

Titanium alloys, stainless steels, as well as other metals and/or refractory-like materials have the necessary resistance to oxidation, erosion, radiation, etc., and blast heating, but they must be made into cell-like structures, or sandwich panels, with or without random and/or lattice support elements to provide necessary strength-weight ratios. Various conformations are being developed, including waffle, expanded-metal, grid, corrugated, cell-like, and/or honeycomb designs, all to form the core in a sandwich or partial sandwich-like structure with outer skin or skins of stainless steel, titanium and other materials and random or lattice support elements. Best and most practical thus far is the honeycomb-like material as the sandwich core, with stainless steel, titanium, or other material as the skin. With brazing or welding as the bonding medium to join core to skin, the sandwich structure is strong and heat-resistant enough to handle all current and projected requirements for a few years.

Honeycomb-like structure is an anisotropic (properties differ with direction) integrated, sheet-metal assembly in which the facings and interfaces are the prime load-carrying members. Proper design permits ultimate tensile, bending and compression strengths to be realized, even with very thin faces, because the core provides continuous or controlled discontinuous support to prevent buckling, yet transmits shear stresses. This is true of adhesive-bonded sandwich, but it can withstand only low temperatures limited by the vegetable, plastic bond, while the brazed or welded type can withstand temperatures limited only by the choice of metals or refractory materials.

There are many production and experimental honeycomb shapes. Some have been stitched, eyeletted, slotted, or expanded to make core structure, but one of the commonest methods is resistance welding which is unaffected by brazing or further welding.

Metallurgical brazing (temperature high enough so there is some diffusion of braze metal into base metal), or welding (temperature high enough so there is some metal diffusion at the inter face), are thus current methods of joining. This provides large bond areas, distributing stresses uniformly-even strengthening the core itself at joints. Surgically clean parts are a necessity thus far, demanding exceedingly well controlled degreasing, pickling, and general handling.

Basic problems are the positioning of brazing alloy and/or flux, and parts in a proper fixture, accurate holding to insure desired shape and yet achieve metal-to-metal contact of faces and core, controlled heating and cooling rates to avoid warpage and stressing, atmospheric protection to avoid oxidation or contamination of parts and contamination of joints, control of post heat treatment to develop desired metallurgical conditions, sizing, coining, or other plastic deformation to strengthen the part by hot or cold work. These are major problems, because it is relatively difficult to repair brazed or welded sandwich panels. It is preferable or necessary for them to be right throughout the entire process.

An object of this invention is to provide a process or method whereby the components of a honeycomb or cell-like core sandwich structure along with the weld interfaces or brazing alloy will be properly located in such a manner as to provide a metal-to-metal contact.

Another object of this invention is to provide a process or method whereby the heat for brazing, or welding, or heat treating of the materials is very accurately controlled through all stages.

A yet further object of this invention is to provide a method or process whereby the components of a honeycomb or cell-like core sandwich structure will, after being raised to heat to braze or weld, have the cooling rates very accurately controlled and the structure adequately held in order that warping and undesired distortion will not occur, and that certain plastic shaping may be controlled.

Another object of this invention is to provide a method or process of brazing or welding honeycomb or cell-like core sandwich structure whereby all the components are protected from and free of contaminating conditions such as oxidation and corrosion.

A yet further object of this invention is to provide structure, equipment, and fixtures for brazing or welding honeycomb or cell-like core sandwich structure.

Another object of this invention is to provide a method and structure for brazing or welding honeycomb or cell-like core sandwich structure which is economical and easily used by relatively unskilled or semiskilled labor.

Another object of this invention is to provide a method and structure for brazing or welding honeycomb or cell-like core structure so that various and selectable areas of such structure may have differing amounts of heat impinged upon them, injected into them, or extracted from them depending upon the density of the honeycomb or cell-like structure or various attachments, fittings, edge members, etc., or metallurgical requirements.

A further object of this invention is to provide equipment and a method for brazing or welding honeycomb or cell-like sandwich structure whereby the time factor involved is of such a short duration that little, if any, warping, oxidation, and other undesired results will occur.

Another object of this invention is to provide a method for brazing or welding honeycomb or cell-like core sandwich structure that utilizes a simplified retort structure.

Briefly, the invention comprises preparing the honeycomb or cell-like core sandwich structure and placing the same in a prepared envelope type fixture or retort. The envelope is sealed and the fixture and structure is exposed to a radiant heat source and brazed or welded. From the heat source the fixture and structure is inserted into a chill former fixture and cooled. The brazed structure is removed from the envelope.

FIGURE 1 is a perspective view illustrating one half of a representative retort.

FIGURE 2 is a view similar to FIGURE 1 but illustrating a portion of the purging system in addition to one half of the retort, and a panel of metal that may be one side of a sandwich structure.

FIGURE 3 is a view illustrating representative components of the sandwich structure located in one half of the envelope or retort.

FIGURE 4 is a cross-sectional view illustrating the sealed retort and representative components of a simple sandwich structure located in proper interrelation.

FIGURE 5 is a schematic illustration showing representative equipment and fixtures for brazing or welding honeycomb or cell-like core sandwich structure.

FIGURE 6 is a cross-sectional view taken on line 6—6 of FIGURE 5 looking in the direction indicated.

FIGURE 7 is a cross-sectional view taken on line 7—7 of FIGURE 5 looking in the direction indicated.

FIGURE 7a is a view similar to FIGURE 7 but illustrating chill former structure in the closed position.

Figure 8:
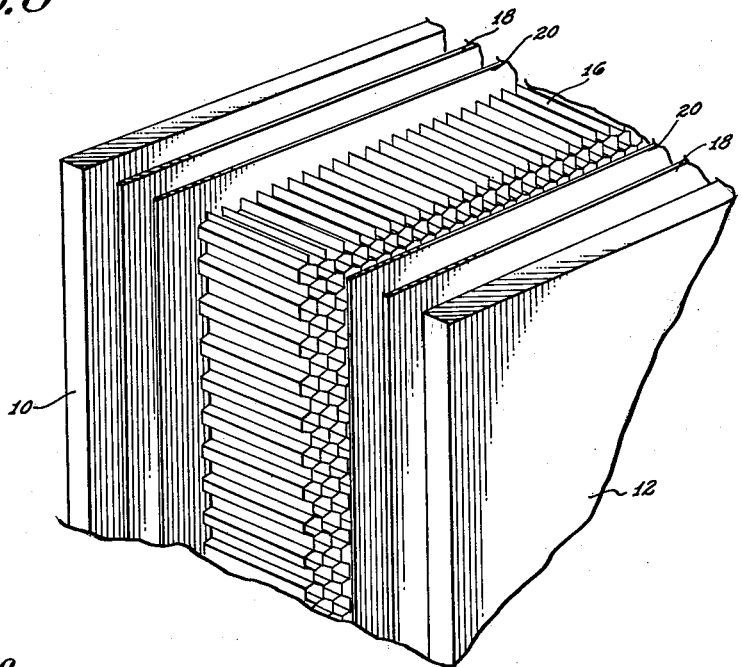
FIGURE 8 is an enlarged perspective view illustrating a representative section of honeycomb or cell-like core, brazing foil, skin panels, and retort.
Figure 9:
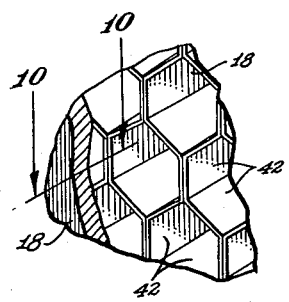
FIGURE 9 is an enlarged perspective view of a section of honeycomb core and the position it is in prior to brazing; it is understood that honeycomb core in all illustrations is being used as representative of a typical cell-like structure which may take other forms, i.e. square, arch, corrugated and other positions in the total structure.

Referring to the drawings for a more detailed description of the present invention 10 and 12 designate two halves of a metal retort or envelope 13. Half 10, shown in FIGURES 1 to 4 inclusive, as well as half 12, is fabricated of stainless steel, or other suitable material, and it may be curved or otherwise shaped to resemble the ultimate shape of the product. The brazing or welding temperature will have a great deal to do with retort material and its gage.

A depression 14, having a peripheral dimension that is just slightly larger than the panel to be brazed, is formed in each half of the retort. The size and shape of the depression is to provide support and to provide for expansion of the sandwich structure. Into these depressions are placed the honeycomb or cell-like core sandwich structure and brazing alloy (when used). The sandwich structure consists of a honeycomb or cell-like core material 16 and a pair of panels or skins 18. Between the panels and the core is placed (when used) a brazing and joining material 20 that may be in either a powder or foil or other condition. The brazing material may be any one of very many that are and may be available. However, again the materials selected are determined by the brazing or welding conditions.

The retort 13 has a pair of arms 22. In each arm is formed a depression 24 and in each depression is located a conduit 26 and 28. These conduits provide a portion of the purging system.

The internal bottom of the depression 14 may or may not be covered with an inhibitor, i.e. a material that will prevent the brazing material 20, when in the liquid state, from adhering to the retort 13.

The retort or envelope 13 is closed in the manner illustrated in FIGURE 4. The edges are sealed in any suitable manner such as by welding, to provide a leak tight condition.

When retort 13 is closed it may be provided with a coating of heat retaining material on the inside and/or outside, either overall or to a specific pattern related to the sandwich structure enclosed. The coating may have varying degrees of emissivity so as to cause more or less heat absorption in panels of varying thicknesses, or having varying density members included. In addition, a removable mask having cutouts or sections more or less transparent to heat may be placed outside of the envelope or retort for varying times during the brazing or welding cycle to further control the heat absorption and specific patterns on the surface.

It is understood that the configuration of the retort 13, core 16, and panels 18 is merely representative. The retort and related sandwich structure may be provided in simple and compound curves. Irregular shapes of all types may also be provided.

Attention is also directed to the fact that only the core 16, panels 18, and brazing material (when used) 20 is in the retort 13.

The next step in the operation, prior to brazing or welding, is the purging of the interior of the assembled retort 13. Conduit 26 may be connected to a source of inert or reducing atmosphere. The atmosphere may be argon, helium or some other equally applicable gas material. However, a feature of importance is that the atmosphere, regardless of its composition, is to be as dry and free of moisture as possible. Otherwise, any moisture breaks down at high temperatures to release oxygen which in turn causes the core 16 and panels 18 to oxidize.

The retort 13 may be purged either in the brazing fixture 30 as is illustrated in FIGURE 5 or it may be purged prior to being placed in the fixture.

The purging cycle consists of applying as good a vacuum as is possible to obtain. This step draws air and oxygen out of the retort. After the vacuum has been applied then argon gas is flowed or urged into the retort 13 until atmospheric or near atmospheric pressure is obtained. This purging cycle is continued for as many as ten times or, in the alternative, until there is a reasonable certainty that there is substantially no air and oxygen inside the retort 13. In order to assure that brazing or welding will occur in an inert atmosphere, the gas constituting such inert atmosphere (as disclosed above) is left inside the retort. However, a negative pressure, i.e. a pressure below atmosphere, should prevail in the retort. This negative pressure tends to clamp or pull all the sandwich structure into a firm metal-to-metal contacting relationship. It further prevents the brazing foil, if foil is used, from slipping out of position.

When bonding sandwich structure it is necessary and essential that all honeycomb core cell walls be attached to the panels 18. Voids are not permitted. If a void occurs the sandwich structure must be rejected.

Therefore, it is important that a vacuum be applied in the retort to provide a good metal-to-metal contacting condition. However, too great a final vacuum will result in the sandwich structure being irregular in the final form. In other words, the cell structure of the honeycomb will show on the outside of the panel and the panel will obviously be rough. To phase it in another way, the panel 18 will be drawn too tightly into the cells of the core 16 and a final "waffle" appearance will result. This undulating or irregular surface is not a desirable result. It is therefore essential that the proper vacuum be obtained and held on the last cycle of the purging step. Of course core and panel material as well as gage will determine what is the proper vacuum.

If the purging cycle occurs out of the fixture 30 the conduits are sealed tight at the proper time in order to prevent any leakage. On the other hand, if the purging takes place in the bonding fixture 30 to be described, then, the conduits 26 and 28 may be continuously connected to the vacuum and inert gas source until the brazing or welding is completed.

Attention is directed to FIGURE 5 of the drawings. The retort 13—illustrated somewhat schematically for the sake of clarity—is shown located in the bonding fixture designated as a whole by the reference numeral 30. However, attention is directed to the fact that the bonding fixture shown in the various figures is schematic and is to be considered only representative. Various and many fixtures may be devised that will perform the proper function.

The fixture illustrated comprises an I beam 32. Individual roller units 34 are located on one flange 36 of the I beam, and from each unit suspends a hook 38. The hooks are inserted in openings in the flanges 40 of the retorts 13 in the manner illustrated. Obviously the roller units 34 are free to roll along flanges 36 when propelled by any suitable means (not shown).

The retort 13 is located in the fixture 30, at the extreme left end, as illustrated in FIGURE 5. It may also be noted that an assembly line fixture is illustrated, i.e. several retorts 13 are located in the fixture 30 at various stations or positions of operation.

The fixture 30 is depicted in FIGURE 5 in a generally horizontal position. Again, this is just for purposes of illustrating schematically a system or method of operation, since the fixture may be in a vertical or other position, and further, the arrangements may be made to move the fixture while the retort remains stationary.

In the event the retort 13 were purged while suspended vertically in the fixture the argon or inert gas, being heavier than air, would tend to force the air up to the top of the retort and out the proper conduit. In other words, a more efficient purging of the retort 13 could be obtained. Additionally, heat which has a tendency to rise would follow the retort from one position or station to the next when vertical movement is used.

Returning to the retort 13 and its position at the extreme left end of the fixture 30, it is to be noted that the retort is suspended in such a manner as to place the sandwich structure in a vertical position. Further, this position is retained throughout the entire operation of brazing or welding. The vertical position of the retort leads to another very distinct advantage which will be pointed out with reference to FIGURE 10 of the drawings.

As before stated, the negative pressure created in the retort 13 in the last step of the purging cycle provides a proper metal-to-metal contact. The honeycomb cell walls 42 are positioned in a biased condition against the foil 20 brazing alloy or other joining material present. The brazing foil 20 is not illustrated in FIGURE 10 for reasons of clarity. When the sandwich structure and retort 13 is suspended in the vertical condition and heated until the brazing material turns to liquid, the cell walls 42 function as a dam to prevent the flow of brazing material to the bottom of the retort. This is in direct contrast to the conventional furnace brazing process. In the furnace brazing method the sandwich structure is in the horizontal position and the brazing material flows to the bottom of the sandwich resulting in uneven filleting. There is nothing to prevent or inhibit the flow. As a result there is a very weak brazed area on the upper side of the sandwich structure and a strong brazed area on the bottom. Obviously, a completely undesirable result.

The retort 13 positioned at the left hand end of bonding fixture 30, is located between a pair of quartz lamp radiant heaters and gold reflectors 43 constituting a first or preheating stage. These radiant heaters may be very accurately controlled to provide the desired amount of heat up to the maximum possible. Additionally, the desired amount of heat can be obtained within 3 minutes time and can be very uniformly distributed or nonuniformly controlled. As illustrated, the radiant heaters 43 may be considered preheaters, i.e. they can be used to bring the temperature of the retort and enclosed structure to a desired heat short of melting the brazing material. Further, the heat source as here applied may be defined as an open walled radiant heat source as distinguished from a furnace which would be defined as a closed walled heat source.

The retort 13 after being preheated is rapidly moved or propelled by any suitable means (not shown) to the second stage or position which provides a second bank or pair of radiant heaters and reflectors 44. Here, the temperature of the radiant heaters, which has been obtained in a very short time, is such as to cause the brazing material to melt or turn to liquid. The retort is retained in this position only a few seconds of time. As soon as the brazing material has properly dispersed itself about the honeycomb cell walls 42, which will occur in the time allowed, the retort is rapidly moved to stage or position three where there is provided a chill former equipment or structure 46. The chill former equipment moves in and out as indicated in FIGURES 7 and 7a. The die or former faces which may be solid or resilient have a configuration that complements that of the retort 13 and enclosed sandwich structure. The chill former equipment 46 functions as a heat sink to withdraw heat from the retort and cause the melted brazing material to solidify or set. Additionally, the chill former structure functions as a medium to set the shape of the brazed sandwich structure. As stated, the retort is moved rapidly from station or position two to position three. This is done for the reason that the greater the delay, the more likelihood that the sandwich structure enclosed in retort 13 will become warped or distorted. The former equipment 46 assists in preventing the warping and distortion when necessary. Due to the fact that the retort 13 and sandwich structure can be formed into any shape and the die faces can be made to complement those shapes, shaped sandwich structure can very easily and readily be brazed or welded.

The retort 13 is transported from the first to the third stage or position without turning off the radiant heaters.

Finally, the chill former equipment 46 can be cooled or heated if desired. A cooling or heating medium inlet and outlet 48 and 50 for each die is provided.

Although the method of operations as previously described refers to a first or preheat stage or position, this stage can, if desired, be dispensed with. On the other hand, more heating stages can be provided if needed or desired.

Both the first and second stage radiant heaters 43 and 44 are identical and, therefore, only one set was illustrated in FIGURE 6.

Figure 10:
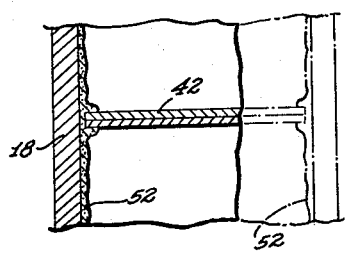
FIGURE 10 is a fragmentary, cross-sectional view taken on line 10—10 of FIGURE 9 looking in the direction indicated and illustrating a section of representative brazed honeycomb core.
Figure 11:
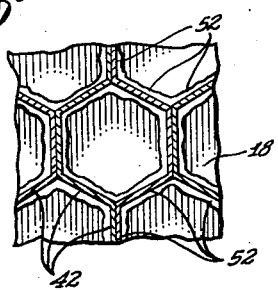
FIGURE 11 is an enlarged fragmentary end view of a representative honeycomb core cell as it appears in the brazed condition.

Attention is directed to FIGURES 10 and 11. It is to be noted that when the sandwich structure is brazed, the fillets 52 about each cell wall 42 are uniform. No more brazing material is located about one cell wall than about the other. It can thus be seen how each wall 42 of each honeycomb cell functions as a dam to prevent undesired flow of brazing material.

Additional stages of lamps can be provided beyond the chill former or heat sink clamp. These subsequent stages would provide heat treatment of the brazed or welded sandwich structure.

Finally, after the retort 13 is properly cooled in the chill former equipment 46, the retort is removed from about the sandwich structure.

The entire operation from the step of purging to removing the brazed or welded structure from the retort 13 should not consume over twenty minutes.

One of the reasons for the success of this described method is that very little time is consumed between each stage.

To recapitulate, the operation of the invention is as follows: The honeycomb core 16 and panels 18, as well as brazing material 20 is placed in a prepared retort 13. The retort is sealed, leak tight, and purged by alternately applying a vacuum and then an inert gas.

The retort is placed in a vertical position in a brazing fixture 30 and submitted to a radiant heat source. There may or may not be applied a preheat stage. The retort and enclosed structure is heated until the brazing material melts and flows about the honeycomb cell walls 42. From the radiant heat source the retort is rapidly moved to chill former equipment where the brazing material is allowed to solidify and the shape of the sandwich structure is finally formed. The brazed sandwich structure is then removed from the retort.

When the structure is welded, substantially the same sequence of events as recited above follows. However, the brazing material is omitted and may or may not be substituted by the use of a solid or semi-solid reducing agent consisting of a eutectic alloy of the structure itself, or of an intermediate alloy when the structure consists of more than one kind of metal. In addition, positive pressure can be used during the welding cycle so as to control the contact between the honeycomb or cell-like core structure and the skin or skins so as to effect the heat transfer and/or electrical conductivity or resistivity.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. The process of brazing in open air a honeycomb core panel or like structure which comprises:
   (a) assembling a sandwich assembly which includes a core of metal honeycomb with a metal panel on each side thereof with the edges of the honeycomb cells abutting the surfaces of said panels and a brazing material therebetween;
   (b) placing said panel and core assembly in a flexible metallic envelope that intimately contacts and conforms to the shape of said panel and core assembly;
   (c) sealing said envelope to render the interior thereof gas-tight except for controlled ingress and egress of gas;
   (d) suspending said envelope in a vertical position;
   (e) replacing the atmosphere in the interior of said envelope with non-oxidizing gas while said envelope is in said vertical position;
   (f) adjusting the interior pressure of said envelope to less than atmospheric pressure;
   (g) placing said vertically suspended envelope between spaced apart radiant lamps to subject the sides of said envelope adjacent thereto solely to the heat emitted by said lamps for a sufficient period of time to raise the temperature in the interior of said envelope to the melting point of said brazing material between cell edges and panel surfaces of the sandwich assembly in said envelope;
   (h) removing said envelope from between said lamps and clamping said envelope between a pair of chilled, pressure-exerting surfaces while said brazing material is still molten to solidify said brazing material while sufficient pressure is exerted against the sides of said envelope to prevent warping thereof;
   (i) removing said clamping pressure from said envelope when said envelope has cooled sufficiently;
   (j) and removing the brazed sandwich panel assembly from said envelope.

2. The process of claim 1 (e) wherein said atmosphere is replaced with non-oxidizing gas by alternately applying vacuum at the uppermost portion of said vertically suspended envelope to withdraw atmosphere therein, and injecting under pressure non-oxidizing gas at the lowermost portion of said envelope.

3. The process of claim 1 (g) wherein said spaced apart radiant lamps are arranged and aligned in banks the planes of which generally correspond to the planes of the surfaces of the envelope adjacent thereto.

4. The process of claim 1 (g) wherein the sides of said envelope adjacent to said radiant lamps is coated with black paint to increase the heat absorption thereby.

5. The process of claim 1 (g) wherein predetermined selected areas of the sides of said envelope adjacent to said radiant lamps is coated with black paint to increase the heat absorption thereby, other predetermined selected areas of the side of said envelope remaining uncoated to control the temperature of predetermined selected portions of said sandwich panel assembly in said envelope.

References Cited in the file of this patent

UNITED STATES PATENTS

| | | |
|---|---|---|
| 844,944 | Jacobs | Feb. 19, 1907 |
| 1,247,250 | Field | Nov. 20, 1917 |
| 1,576,559 | Swift | Mar. 16, 1926 |
| 2,423,870 | Blessing | July 15, 1947 |
| 2,615,702 | Allert | Feb. 18, 1950 |
| 2,742,387 | Giuliani | Apr. 17, 1956 |
| 2,746,139 | Van Pappelendam | May 22, 1956 |
| 2,756,496 | Holland | July 31, 1956 |
| 2,816,355 | Herman | Dec. 17, 1957 |
| 2,845,698 | Giovannucci et al. | Aug. 5, 1958 |
| 2,979,005 | Herbert | Apr. 11, 1961 |
| 3,009,241 | Giovannucci | Nov. 21, 1961 |

FOREIGN PATENTS

| | | |
|---|---|---|
| 1,162,692 | France | Apr. 14, 1958 |